(12) United States Patent
Shuai et al.

(10) Patent No.: US 12,388,355 B1
(45) Date of Patent: Aug. 12, 2025

(54) FAULT TOLERANCE METHOD BASED ON SEABED MEDIUM-VOLTAGE DIRECT-CURRENT CONVERTER AND REDUNDANT TOPOLOGICAL STRUCTURE

(71) Applicant: Hunan University, Changsha (CN)

(72) Inventors: Zhikang Shuai, Changsha (CN); Wei Wang, Changsha (CN); Yingzhou Peng, Changsha (CN); Yang Li, Changsha (CN); Quanjie Wang, Changsha (CN); Zhixing He, Changsha (CN); Kecun Gao, Changsha (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 19/202,197

(22) Filed: May 8, 2025

(30) Foreign Application Priority Data

Jul. 18, 2024 (CN) .......................... 202410966578.6

(51) Int. Cl.
*H02M 1/32* (2007.01)
*H02M 1/00* (2006.01)
*H02M 1/36* (2007.01)
*H02M 3/00* (2006.01)
*H02M 3/335* (2006.01)

(52) U.S. Cl.
CPC ........... *H02M 1/325* (2021.05); *H02M 1/007* (2021.05); *H02M 1/36* (2013.01); *H02M 3/01* (2021.05); *H02M 3/33569* (2013.01)

(58) Field of Classification Search
CPC ........ H02M 1/325; H02M 1/007; H02M 3/01; H02M 1/36; H02M 3/33569
See application file for complete search history.

(56) References Cited

U.S. PATENT DOCUMENTS

2015/0008748 A1* 1/2015 Deboy ............. H02M 7/53871
307/77
2023/0144700 A1* 5/2023 Yao ...................... H02M 7/521
363/13

(Continued)

FOREIGN PATENT DOCUMENTS

| CN | 108233720 A | 6/2018 |
|---|---|---|
| CN | 113054737 A | 6/2021 |
| CN | 115776225 A | 3/2023 |

*Primary Examiner* — Rafael O De Leon Domenech
(74) *Attorney, Agent, or Firm* — Nitin Kaushik

(57) ABSTRACT

A fault tolerance method based on a seabed medium-voltage direct-current converter, and a redundant topological structure are provided. The method controls and adjusts working states of resonant conversion modules and switch states of redundant switching structures connected to the resonant conversion modules, to supply power to a load; and in the process of supplying power to the load, obtains fault diagnosis results for the resonant conversion modules. Based on the fault diagnosis results, that a faulty module exists in the resonant conversion modules, the faulty module is removed. After the faulty module is removed, a redundant resonant conversion module is determined, and the working state of the redundant resonant conversion module and the switch state of the redundant switching structure connected to the redundant resonant conversion module are adjusted, wherein the redundant resonant conversion module is configured to replace the faulty module.

6 Claims, 10 Drawing Sheets

(56) References Cited

U.S. PATENT DOCUMENTS

| | | | |
|---|---|---|---|
| 2023/0268821 A1* | 8/2023 | Moon | H02M 3/33571 |
| | | | 363/21.02 |
| 2024/0258931 A1* | 8/2024 | Xu | H02M 1/32 |
| 2025/0145043 A1* | 5/2025 | Sharida | B60L 53/16 |

* cited by examiner (a) Waveform of input voltage (b) Waveform of input current

FAULT TOLERANCE METHOD BASED ON SEABED MEDIUM-VOLTAGE DIRECT-CURRENT CONVERTER AND REDUNDANT TOPOLOGICAL STRUCTURE

CROSS-REFERENCE TO RELATED APPLICATIONS

The present disclosure claims the benefit and priority of Chinese Patent disclosure No. 202410966578.6 filed with the China National Intellectual Property Administration on Jul. 18, 2024, the disclosure of which is incorporated by reference herein in its entirety as part of the present disclosure.

TECHNICAL FIELD

The present disclosure relates to the technical field of power systems, and in particular, to a fault tolerance method based on a seabed medium-voltage direct-current converter and a redundant topological structure.

BACKGROUND

A seabed medium-voltage direct-current converter is responsible for converting several or tens of kilovolts of direct-current medium voltage into hundreds of volts of direct-current low voltage. The seabed medium-voltage direct-current converter is a "power heart" of an entire seabed observation network and will directly affect the safety and reliability of operation of an entire power supply system. The seabed medium-voltage direct-current converter uses an Input Series Output Parallel (ISOP) structure, which can well meet electric energy conversion needs for large seabed voltage change ratio from higher voltage levels to lower voltage levels and high-power density.

However, heat dissipation of a tightly sealed and compact deep-sea junction box increases the failure probability of the seabed medium-voltage direct-current converter. Once the seabed medium-voltage direct-current converter fails, power supplying may be directly interrupted, which greatly affects various seabed services such as marine scientific research, environmental monitoring, resource exploration, and disaster prevention. In the related technology, the solution used for the failure of the seabed medium-voltage direct-current converter is not ideal. Therefore, how to carry out fault tolerance on the seabed medium-voltage direct-current converter is currently a technical difficulty for the seabed observation network.

SUMMARY

In view of this, it is necessary to provide a fault tolerance method based on a seabed medium-voltage direct-current converter and a redundant topological structure, which can improve the safe and reliable operation capability of the seabed medium-voltage direct-current converter.

In a first aspect, the present disclosure provides a fault tolerance method based on a seabed medium-voltage direct-current converter, applied to a controller, wherein a signal end of the controller is connected to a signal end of a direct-current converter including a redundant topological structure; an electric energy input end of the redundant topological structure is connected to one end of a power supply; an electric energy output end of the redundant topological structure is connected to one end of a load; the other end of the load is connected to the other end of the power supply; electric energy generated by the power supply flows into the load after being processed by the redundant topological structure;

the redundant topological structure includes a plurality of cascaded redundant switching structures, and an output end of each redundant switching structure is connected to an input end of a resonant conversion module corresponding to the redundant switching structure; output ends of the resonant conversion modules are respectively connected to two ends of the load; the method includes:

controlling and adjusting switch states of the redundant switching modules and working states of the resonant conversion modules connected to the redundant switching structures, to supply the electric energy output by the power supply to the load after the electric energy is processed by the resonant conversion modules;

in the process of supplying power to the load, obtaining fault diagnosis results for the resonant conversion modules;

when it is determined, based on the fault diagnosis results, that a faulty module exists in the resonant conversion modules, removing the faulty module; and after the faulty module is removed, determining a redundant resonant conversion module from the resonant conversion modules, and adjusting the working state of the redundant resonant conversion module and the switch state of the redundant switching structure connected to the redundant resonant conversion module, wherein the redundant resonant conversion module is configured to replace the faulty module.

In a second aspect, the present disclosure further provides a redundant topological structure. The redundant topological structure includes a plurality of cascaded redundant switching structures, and an output end of each redundant switching structure is connected to an input end of a resonant conversion module corresponding to the redundant switching structure; output ends of the resonant conversion modules are respectively connected to two ends of a load; the redundant switching structures include one redundant switching structure;

an electric energy input end of the redundant topological structure is connected to one end of a power supply; an electric energy output end of the redundant topological structure is connected to one end of the load; the other end of the load is connected to the other end of the power supply; and electric energy generated by the power supply flows into the load after being processed by the redundant topological structure.

In a third aspect, the present disclosure further provides a controller. The controller includes a memory and a processor. The memory stores a computer program, and the processor implements the steps of the above fault tolerance method based on the seabed medium-voltage direct-current converter when running the computer program.

In a fourth aspect, the present disclosure further provides a computer-readable storage medium. The computer-readable storage medium stores a computer program which, when run by a processor, implements the steps of the above fault tolerance method based on the seabed medium-voltage direct-current converter.

In a fifth aspect, the present disclosure further provides a computer program product. The computer program product includes a computer program which, when run by a processor, implements the steps of the above fault tolerance method based on the seabed medium-voltage direct-current converter.

The above fault tolerance method based on the seabed medium-voltage direct-current converter and the redundant topological structure are applied to a controller. A signal end of the controller is connected to a signal end of a direct-current converter including a redundant topological structure; an electric energy input end of the redundant topological structure is connected to one end of a power supply; an electric energy output end of the redundant topological structure is connected to one end of a load; the other end of the load is connected to the other end of the power supply. The electric energy generated by the power supply flows into the load after being processed by the redundant topological structure. The redundant topological structure includes a plurality of cascaded redundant switching structures, and an output end of each cascaded redundant switching structure is connected to an input end of a resonant conversion module corresponding to the cascaded redundant switching structure; and output ends of the resonant conversion modules are respectively connected to two ends of the load. In a fault tolerance process of the seabed medium-voltage direct-current converter, by adjusting the working states of the resonant conversion modules and the switch states of the redundant switching structures connected to the resonant conversion modules, to supply the electric energy output by the power supply to the load after being processed by the resonant conversion modules, so that the medium-voltage direct-current converter can work normally. When one of the resonant conversion modules fails, the faulty module can be quickly and accurately identified and removed. Meanwhile, the redundant resonant conversion modules and the redundant switching structures connected to the redundant resonant conversion modules are used for redundant switching to ensure that the medium-voltage direct-current converter can continuously supply power to the load. This fault diagnosis result highly cooperates with redundant switching, which greatly improves the safety and reliability of a seabed observation network system. Further, due to the unique nature of a deep-sea environment, it is very hard and expensive to repair seabed equipment. By a fault-tolerant operation solution that achieves collaborative control of fault diagnosis and redundancy, the present disclosure can reduce downtime and a number of times of maintenance caused by equipment failures, thereby reducing the maintenance costs.

BRIEF DESCRIPTION OF DRAWINGS

FIG. 7 shows a waveform of an input port during fault-tolerant operation of a converter in an embodiment, wherein FIG. 7(a) shows a waveform of an input voltage, and FIG. 7(b) shows a waveform of an input current;

FIG. 8 shows a waveform of an output port during fault-tolerant operation of a converter in an embodiment, wherein FIG. 8(a) shows a waveform of an output voltage, and FIG. 8(b) shows a waveform of an output current;

DETAILED DESCRIPTION OF THE EMBODIMENTS

Figure 1:
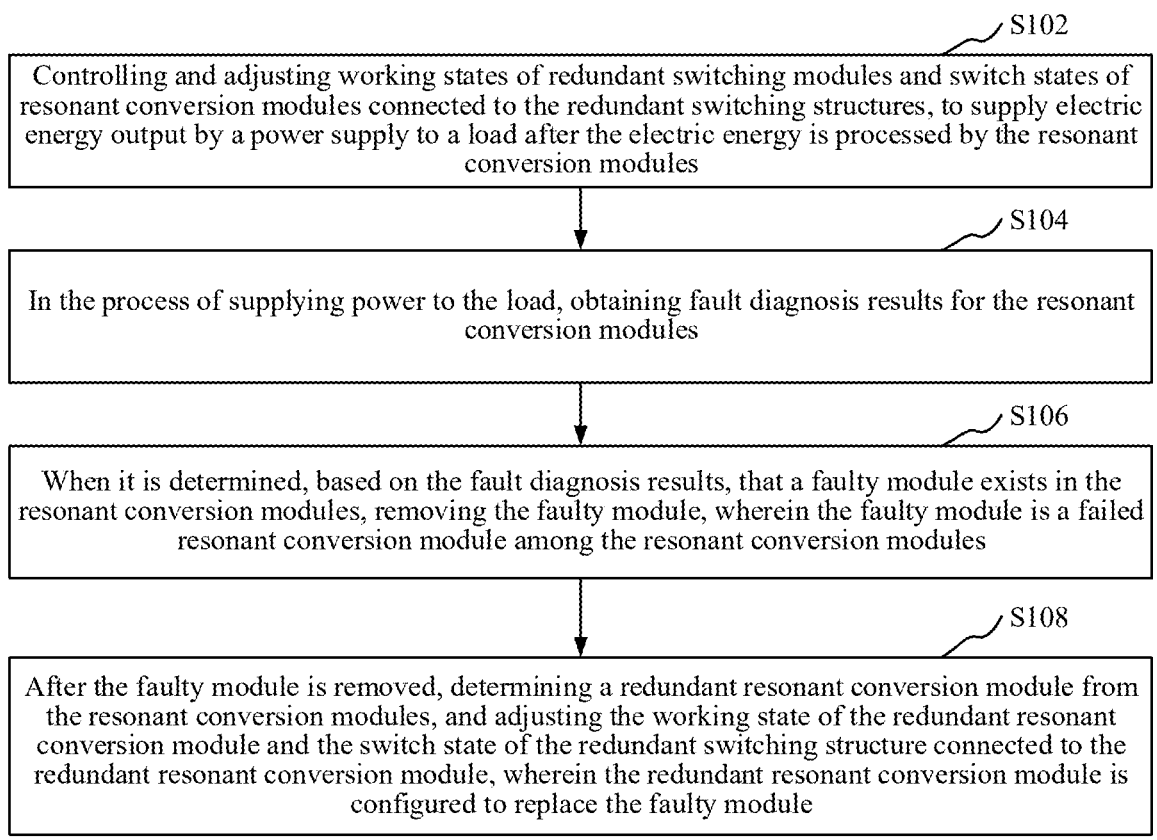
FIG. 1 is a flowchart of a fault tolerance method based on a seabed medium-voltage direct-current converter in an embodiment.

To make the objectives, technical solutions, and advantages of the present disclosure clearer, the following is a further detailed explanation of the present disclosure in conjunction with the accompanying drawings and embodiments. It should be understood that the specific embodiments described here are only intended to explain the present disclosure and are not intended to limit the present disclosure.

A fault tolerance method based on a seabed medium-voltage direct-current converter according to an embodiment of the present disclosure is applied to a controller. A signal end of the controller is connected to a signal end of a direct-current converter including a redundant topological structure; an electric energy input end of the redundant topological structure is connected to one end of a power supply; an electric energy output end of the redundant topological structure is connected to one end of a load; the other end of the load is connected to the other end of the power supply; and electric energy generated by the power supply flows into the load after being processed by the redundant topological structure. The redundant topological structure includes a plurality of cascaded redundant switching structures, and an output end of each cascaded redundant switching structure is connected to an input end of a resonant conversion module corresponding to the cascaded redundant switching structure; and output ends of the resonant conversion modules are respectively connected to two ends of the load. The controller can control and adjust working states of resonant conversion modules and switch states of redundant switching structures connected to the resonant conversion modules, to supply the electric energy output by the power supply to the load after being processed by the resonant conversion modules; in the process of supplying power to the load, obtain fault diagnosis results for the resonant conversion modules; when it is determined, based on the fault diagnosis results, that a faulty module exists in the resonant conversion modules, remove the faulty module; and after the faulty module is removed, determine a redundant resonant conversion module from the resonant conversion modules, and adjust the working state of the redundant resonant conversion module and the switch state of the redundant switching structure connected to the redundant resonant conversion module, wherein the redundant resonant conversion module is configured to replace the faulty module.

In some embodiments, the medium-voltage direct-current converter in the present disclosure may be an Input Series Output Parallel (ISOP) direct-current converter. The controller may be a Digital Signal Processing (DSP) controller. The DSP controller is a microcontroller commonly used in digital signal processing to mainly control the ISOP direct-current converter. The redundant switching structures and the resonant conversion modules connected to the redundant switching structures can be directly controlled by the DSP controller, or the redundant switching structures can be provided with corresponding sub controllers. The DSP controller sends signals to the sub controllers, and then the sub controllers correspondingly control the redundant switching structures and the resonant conversion modules connected to the redundant switching structures. Of course, the redundant switching structures and the resonant conversion modules connected to the redundant switching structures can be directly controlled by the DSP controller. This embodiment of the present disclosure does not impose a limitation on this.

In an embodiment, as shown in FIG. 1, a fault tolerance method based on a seabed medium-voltage direct-current converter is provided. Applying the method to a controller is taken as an example for explanation. The method includes the following steps:

Step 102, controlling and adjusting working states of the resonant conversion modules and switch states of the redundant switching structures connected to the resonant conversion modules, to supply the electric energy output by the power supply to the load after being processed by the resonant conversion modules.

The working state means whether a resonant conversion module is in a state of processing a voltage, and can specifically include a locked state and an unlocked state. In the locked state, switch transistors in the resonant conversion module are all in off states. The switch states mean states of different switches in the redundant switching structures, and the switch states can include a state in which the switches are closed and a state in which the switches are opened.

In some embodiments, each redundant switching structure at least includes a first direct-current contactor and a second direct-current contactor; an input end of the first direct-current contactor and an input end of the second direct-current contactor are connected to one end of the power supply, and an output end of the first direct-current contactor and an output end of the second direct-current contactor are respectively connected to two ends of an input filter capacitor;

The controlling and adjusting working states of the resonant conversion modules and switch states of the redundant switching structures connected to the resonant conversion modules includes: controlling the working state of the redundant resonant conversion module to a locked state, and controlling the first direct-current contactor and the second direct-current contactor of the redundant switching structure connected to the redundant resonant conversion module to be in a first state; and controlling the working states of other resonant conversion modules other than the redundant resonant conversion module to unlocked states, and controlling the first direct-current contactors and the second direct-current contactors of the redundant switching structures connected to other resonant conversion modules to be in second states.

Each redundant switching structure at least includes two switches, namely the first direct-current contactor and the second direct-current contactor. The redundant resonant conversion module is one of the plurality of resonant conversion modules, and its structure is the same as structures of other resonant conversion modules. A difference is that when the direct-current converter works normally, the redundant resonant conversion module and the redundant switching structure connected to the redundant resonant conversion module are bypassed, and other resonant conversion modules work normally. In some embodiments, four, five, . . . , and N resonant conversion modules may be included, and N is not equal to 0. Specifically, the number of the resonant conversion modules is related to a structure, function, and model number of the direct-current converter. This embodiment of the present disclosure does not impose a limitation on this. Correspondingly, there may be one or more redundant resonant conversion modules.

Specifically, during normal operation of the direct-current converter, the working state of the redundant resonant conversion module is different from the working states of other resonant conversion modules, and the switch state of the redundant switching structure connected to the redundant resonant conversion module is also different from the switch states of other redundant switching structures. The controller can control the working state of the redundant resonant conversion module to the locked state, and control the first direct-current contactor and the second direct-current contactor of the redundant switching structure connected to the redundant resonant conversion module to be in the first states, so that the redundant resonant conversion module is bypassed. The controller can control the first direct-current contactors and the second direct-current contactors of the redundant switching structures connected to other resonant conversion modules other than the redundant resonant conversion module to be in the second states, and control the working states of other resonant conversion modules other than the redundant resonant conversion module to the unlocked states, so that the direct-current converter can work normally.

In some embodiments, the controlling the first direct-current contactor and the second direct-current contactor of the redundant switching structure connected to the redundant resonant conversion module to be in a first state includes:

sending a first switch open or close signal to the redundant switching structure connected to the redundant resonant conversion module, and controlling, based on the first switch open or close signal, the first direct-current contactor of the redundant switching structure connected to the redundant resonant conversion module to be opened and the second direct-current contactor of the redundant switching structure connected to the redundant resonant conversion module to be closed.

The first switch open or close signal is a signal for controlling switches of the redundant switching structure connected to the redundant resonant conversion module to be opened or closed. The controller can directly control, based on the first switch open or close signal, the first direct-current contactor to be opened and the second direct-current converter to be closed, so that the redundant resonant conversion module can be bypassed. Certainly, it may be possible that each redundant switching structure is connected to a sub controller, and the controller can send the first switch open or close signal to the sub controller of the redundant switching structure connected to the redundant resonant conversion module. The sub controller controls, based on the first switch open or close signal, the first direct-current contactor to be opened and the second direct-current contactor to be closed.

In some embodiments, the controlling the first direct-current contactors and the second direct-current contactors of the redundant switching structures connected to other resonant conversion modules to be in second states includes: sending a second switch open or close signal to the redundant switching structures connected to other resonant conversion modules, and controlling, based on the second switch open or close signal, the first direct-current contactors of the redundant switching structures connected to other resonant conversion modules to be closed and the second direct-current contactors of the redundant switching structures connected to other resonant conversion modules to be opened.

The second switch open or close signal is a signal for controlling switches of the redundant switching structures connected to other resonant conversion modules to be on or off. The controller can directly control, based on the second switch open or close signal, the first direct-current contactors to be opened and the second direct-current converters to be closed, so that the direct-current converter can work normally. Certainly, the controller can send the second switch open or close signal to the sub controllers of the redundant switching structure connected to other resonant conversion modules. The sub controllers control, based on the second switch open or close signal, the first direct-current contactors to be closed and the second direct-current contactors to be opened.

Step 104, in the process of supplying power to the load, obtaining fault diagnosis results for the resonant conversion modules.

The fault diagnosis results are targeted at the resonant conversion modules, that is, to determine whether the resonant conversion modules fail in the process of supplying power to the load.

In some embodiments, the signal end of the controller is further connected to a fault diagnosis module, and the method further includes: obtaining, by the fault diagnosis module, circuit parameters of the resonant conversion modules, and performing fault diagnosis respectively for the resonant conversion modules based on the circuit parameters to obtain the fault diagnosis results, and sending the fault diagnosis results to the controller; and obtaining, by the controller, the fault diagnosis results sent by the fault diagnosis module.

The circuit parameters can include input voltages, input currents, and output voltages of the resonant conversion modules. Specifically, the input voltages, the input currents, and the output voltages of other resonant conversion modules other than the redundant resonant conversion module can be acquired through sensors; the input voltages, the input currents, and the output voltages of the resonant conversion modules can be compared pairwise; and comparison results can be used as the fault diagnosis results; and the faulty resonant conversion module is determined based on the fault diagnosis results.

Step 106, when it is determined, based on the fault diagnosis results, that a faulty module exists in the resonant conversion modules, removing the faulty module.

In some embodiments, when it is determined, based on the fault diagnosis results, that a faulty module exists in the resonant conversion modules, the removing the faulty module includes: outputting a switch locking signal to the faulty module to control the faulty module to complete locking of a switch transistor based on the switch locking signal; and when it is determined that the switch transistor in the faulty module is locked, controlling the switch state of the redundant switching structure connected to the faulty module to remove the faulty module.

Specifically, when the controller determines that the faulty module exists, to ensure the safety of the faulty module, the controller preferentially outputs the switch locking signal, to lock all switch devices in the faulty module. When it is determined that the switch transistor in the faulty module is locked, the switch state of the redundant switching structure connected to the faulty module is controlled to remove the faulty module.

In some embodiments, each redundant switching structure includes a first direct-current contactor, a second direct-current contactor, and a current-limiting resistor connected in parallel to the first direct-current contactor; an input end of the first direct-current contactor and an input end of the second direct-current contactor are connected to one end of the power supply, and an output end of the first direct-current contactor and an output end of the second direct-current contactor are respectively connected to two ends of an input filter capacitor; and the controlling the switch state of the redundant switching structure connected to the faulty module to remove the faulty module includes:

sending a switch off signal to the redundant switching structure connected to the faulty module, to drive, based on the switch off signal, the first direct-current contactor of the redundant switching structure connected to the faulty module to be opened, to limit a discharge current of the filter capacitor through the current-limiting resistor; and after it is determined that the first direct-current contactor of the redundant switching structure connected to the faulty module is opened, sending a switch on signal to the redundant switching structure connected to the faulty module, driving, based on the switch on signal, the second direct-current contactor of the redundant switching structure connected to the faulty module to be closed.

Specifically, the controller can send a switch off signal to the redundant switching structure connected to the faulty module. To reduce on-state loss, a direct-current contactor, instead of a fully controlled switch device, is used. A time limit of this process can be milliseconds (ms) or above. The purpose of controlling the first direct-current contactor to be opened is to put into use a current-limiting resistor connected in parallel with the first direct-current contactor to limit a bleeder current of the filter capacitor of the faulty module in the next step, to avoid damage to the device due to an impact current. This ensures the safety of the first direct-current contactor and the second direct-current contactor. After determining that the first direct-current contactor of the redundant switching structure connected to the faulty module is opened, the controller then sends the switch on signal to drive, based on the switch on signal, the second direct-current contactor of the redundant switching structure connected to the faulty module to be closed. In this case, since the input end of the faulty module is bypassed by the second direct-current contactor, energy may not be transmitted to the faulty module, and an input current may flow in the normal modules through the second direct-current contactor. Furthermore, the closed second direct-current contactor may form a resistor-capacitor (RC) discharge circuit with the current-limiting resistor and the filter capacitor.

Figure 2:
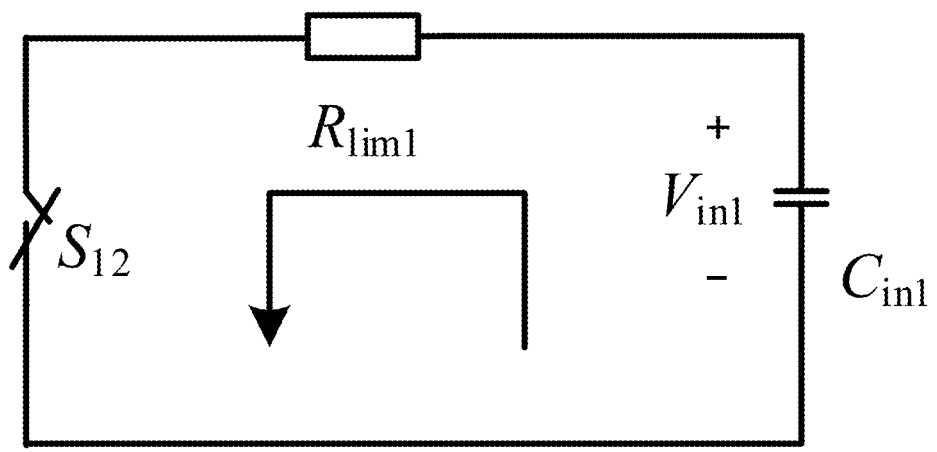
FIG. 2 is a schematic diagram of an equivalent circuit in an embodiment.

In some embodiments, in a discharge process of an input capacitor of the faulty module, its equivalent circuit is shown in FIG. 2. A voltage on the input capacitor $C_{in1}$ (i.e. the filter capacitor) of the faulty module forms a discharge circuit through the current-limiting resistor, which is consistent with an RC discharge circuit. If an initial capacitive voltage is $V_{in1}$, a residual voltage $v_{C1}$ at two ends of the capacitor is:

$$v_{C1} = V_{in1} \cdot e^{-\frac{t}{R_{lim1} C_{in1}}}$$

After discharge time $\Delta t = 4 R_{lim1} C_{in1}$, a voltage of the input capacitor of the faulty module drops over 98%, and most energy is released. Therefore, a corresponding maximum discharge current is $I_{max}$, and suitable current-limiting resistors and direct-current contactors can be selected according to an actual working condition of the faulty module.

$$I_{max} = \frac{4V_{in1}C_{in1}}{\Delta t}$$

Step 108, after the faulty module is removed, determining a redundant resonant conversion module, and adjusting the working state of the redundant resonant conversion module and the switch state of the redundant switching structure connected to the redundant resonant conversion module, wherein the redundant resonant conversion module is configured to replace the faulty module.

Specifically, after the release of the energy of the input capacitor of the faulty module is completed, it is determined that the faulty module has been removed, the resonant conversion module put-into-use stage is executed. In the put-into-use stage, the redundant switching structure is controlled for switching by controlling states of the first and second contactors, and finally a reconstructed topology is controlled to restore the normal operation. Specifically, this can be achieved by adjusting the working states of the resonant conversion modules and the switch states of the redundant switching structures connected to the resonant conversion modules.

In some embodiments, the redundant switching structure connected to the redundant resonant conversion module includes a first direct-current contactor, a second direct-current contactor, and a current-limiting resistor connected in parallel to the first direct-current contactor; an input end of the first direct-current contactor and an input end of the second direct-current contactor are connected to one end of the power supply, and an output end of the first direct-current contactor and an output end of the second direct-current contactor are respectively connected to two ends of an input filter capacitor;

the adjusting working states of the resonant conversion modules and switch states of the redundant switching structures connected to the resonant conversion modules includes:

sending a switch off signal to the redundant switching structure connected to the redundant resonant conversion module, to drive, based on the switch off signal, the second direct-current contactor of the redundant switching structure connected to the redundant resonant conversion module to be opened, to perform current-limited charging on the filter capacitor through the current-limiting resistor; if it is detected, after the second direct-current contactor of the redundant switching structure connected to the redundant resonant conversion module is opened, that a voltage of the filter capacitor reaches a preset voltage threshold, controlling the redundant resonant conversion module to be started; and when the redundant resonant conversion module is in a stable operating state, sending a switch on signal to the redundant switching structure connected to the redundant resonant conversion module, and driving, based on the switch on signal, the first direct-current contactor of the redundant switching structure connected to the redundant resonant conversion module to be closed.

In some embodiments, in a general default case, all switch transistors are in the locked states before the redundant switching structure connected to the redundant resonant conversion module is put into use. After the faulty module is removed, the controller sends the switch off signal to the sub controller of the redundant switching structure connected to the redundant resonant conversion module, so that the sub controller drives, based on the switch off signal, the second direct-current contactor to be opened. In this case, the switch of the redundant switching structure connected to the redundant resonant conversion module is locked. A bus voltage charges the filter capacitor through the buffer current-limiting resistor until it is detected that the voltage of the input capacitor reaches the preset voltage threshold. The preset voltage threshold can be a preset start voltage threshold. The controller can send a start signal to the redundant resonant conversion module and start the redundant resonant conversion module based on the start signal. When the redundant resonant conversion module is in a stable operating state, the controller sends the switch on signal to the redundant switching structure connected to the redundant resonant conversion module, and drives, based on the switch on signal, the first direct-current contactor of the redundant switching structure connected to the redundant resonant conversion module to be closed, so as to bypass the current-limiting resistor. This reduces resistance loss during subsequent normal operation.

Figure 3:
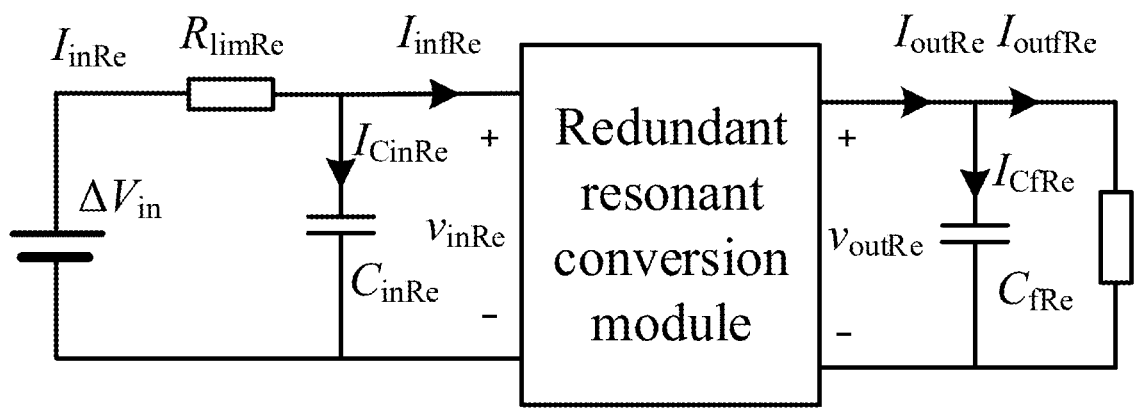
FIG. 3 is a schematic diagram of an equivalent circuit in another embodiment.

In some embodiments, referring to FIG. 3, a diagram of an equivalent circuit involved in a put-into-use process of the redundant switching structure connected to the redundant resonant conversion module is shown:

In a first stage of start, all switch transistors inside the redundant resonant conversion module are locked. According to the diagram of the equivalent circuit shown in FIG. 3, a transient equation for charging the input capacitor on the left side of the redundant switching structure is:

$$\Delta V_{in} = R_{limRe}C_{inRe}\frac{dv_{inRe}}{dt} + V_{inRe}$$

Where $\Delta V_{in}$ is a voltage value of the bus voltage $V_{in}$ distributed in the redundant resonant conversion module. Since the input capacitor of the redundant switching structure is consistent, $\Delta V_{in}$ will eventually approach $V_{in}/n$. According to the transient equation, a relationship between voltage $v_{inRe}$ and current $i_{CinRe}$ on the input capacitor $C_{inRe}$ (i.e. the filter capacitor) can be obtained as follows:

$$v_{inRe} = \Delta V_{in}\left(1 - e^{-\frac{t}{\tau}}\right)$$

$$i_{CinRe} = C_{inRe}\frac{dv_{inRe}}{dt} = \frac{\Delta V_{in}}{R_{limRe}}e^{-\frac{t}{\tau}}$$

Where $\tau = R_{limRe}C_{inRe}$.

According to the relationship between voltage $v_{inRe}$ and current $i_{CinRe}$ on the input capacitor $C_{inRe}$, it can be seen that the time for the voltage at two ends of the input capacitor $C_{inRe}$ to reach a predetermined start voltage can be controlled by adjusting the current-limiting resistor, and the maximum charging current is $I_{CinRe\_max} = \Delta V_{in}/R_{limRe}$. Therefore, during the design of the buffer current-limiting resistor, it is necessary to fully consider that a maximum withstand current Imax of a direct-current contactor or another device is less than the maximum charging current, i.e. $I_{max}$</$C_{inRe\_max}$, to ensure the safety of equipment.

In some embodiments, the controlling the redundant resonant conversion module to be started includes: sending a soft start control signal to the redundant resonant conversion module, and changing a switching frequency and a duty cycle based on the soft start control signal, to start the redundant resonant conversion module.

Specifically, the controller can send the soft start control signal to the redundant resonant conversion module to start the redundant resonant conversion module, so as to charge an output filter capacitor. To reduce a surge current stress on the output filter capacitor, a high switching frequency and a small duty cycle are used to start the redundant resonant conversion module, and then the switching frequency is slowly reduced to a resonance frequency. Meanwhile, the duty cycle is increased to a rated duty cycle, to charge the output filter capacitor to a rated output voltage.

In some embodiments, a transient equation at an output end in the soft start process is as follows:

$$R_{CfRe} C_{fRe} \frac{dv_{CfRe}}{dt} + v_{CfRe} = v_{cd}$$

$$v_{CfRe} = v_{cd}\left(1 - e^{-\frac{t}{R_{CfRe}C_{fRe}}}\right)$$

Where $v_{cd}$ represents a secondary-side voltage value of a high-frequency isolation transformer. According to a gain calculation formula of a resonant conversion module, it can be seen that $v_{cd}$ is related to the switching frequency and the duty cycle. A smaller duty cycle indicates a smaller fundamental value of the input voltage, a smaller resonant conversion gain, and a smaller voltage $v_{cd}$. Similarly, a large switching frequency indicates a larger normalization frequency, a smaller resonant conversion gain, and a smaller voltage $v_{cd}$. Therefore, it can be seen from the transient equation at the output end in the soft start process that by controlling the duty cycle and the switching frequency, the output voltage can be gradually increased, thereby reducing a current impact on an output circuit and ensuring the safety of a secondary-side uncontrollable rectifier diode and the safety of the output filter capacitor.

Figure 4:
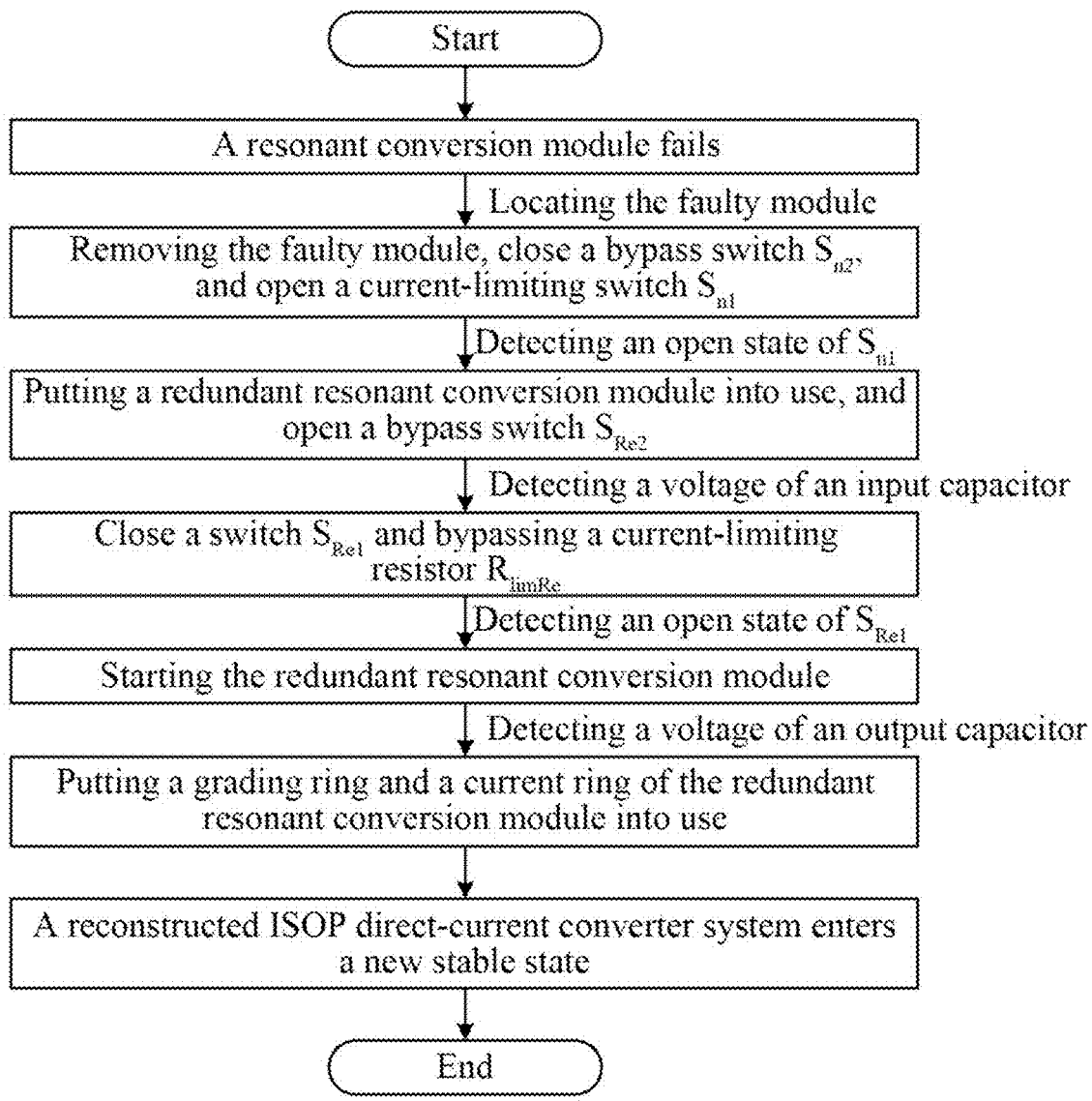
FIG. 4 is a flowchart of a fault tolerance method based on a seabed medium-voltage direct-current converter in another embodiment.

In an embodiment, as shown in FIG. 4, a flowchart of a fault tolerance method based on a seabed medium-voltage direct-current converter in an embodiment is shown. FIG. 4 can be specifically implemented on a redundant topological structure shown in FIG. 5.

Figure 5:
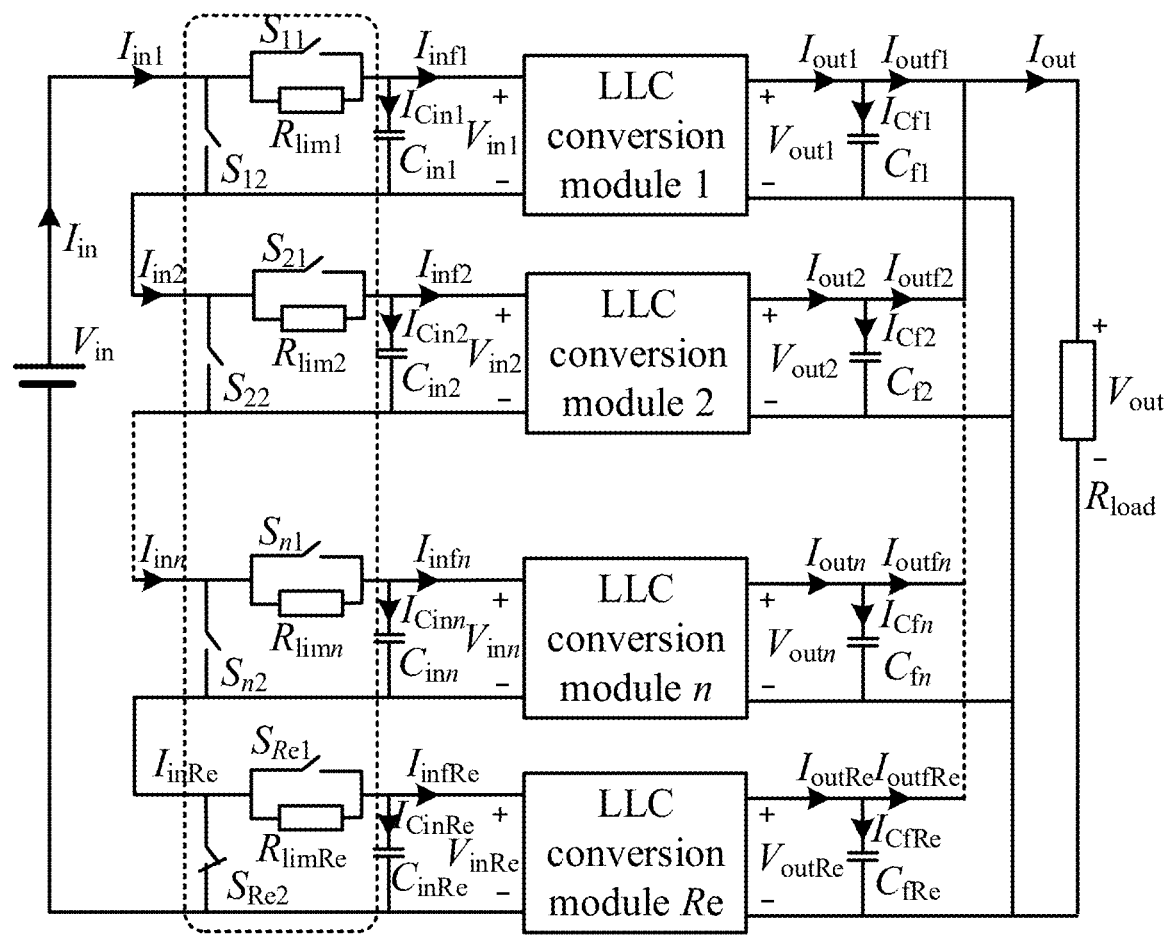
FIG. 5 is a structural block diagram of a redundant topological structure in an embodiment.

As shown in FIG. 5, a bypass-type redundant structure based on reuse of a charge and discharge current-limiting resistor is provided. A redundant switching structure is added to a basic ISOP direct-current converter topology. The redundant switching structure is mainly composed of an LLC module (i.e. a resonant conversion module), a direct-current contactor Sn1 for charge and discharge current-limiting switching, a direct-current contactor Sn2 for bypassing a switch, and a resistor Rlinn for charge and discharge current limitation. A specific redundant switching process is analyzed in detail below:

After a resonant conversion module, i.e. the LLC conversion module, of the seabed ISOP direct-current converter that operates normally fails, to ensure a stable electric energy conversion function of the seabed ISOP direct-current converter and reliable power supplying of a seabed power supply system, redundant switching control is performed using the topology shown in FIG. 5, a converter system that is the same as the topology before the failure is reconstructed to achieve fault-tolerant operation of the seabed direct-current system. The specific analysis is as follows:

When the seabed ISOP direct-current converter operates normally, for the redundant switching structures connected to other resonant conversion modules other than a redundant resonant conversion module, the switches $S_{n2}$ are all opened, and the switches $S_{n1}$ are all closed. For the redundant resonant conversion module, the switch $S_{Re2}$ is closed, and the switch $S_{Re1}$ is opened. In this case, the redundant resonant conversion module is bypassed, and other resonant conversion modules are connected to the seabed ISOP converter system and work normally. If it is detected that a faulty module exists, all the switch devices inside the faulty module are locked on the premise of ensuring the safety of the faulty module. Next, the faulty module is removed. The switches $S_{n2}$ are closed, and the current-limiting switches $S_{n1}$ are opened, to form a discharge circuit for an input filter capacitor of the faulty module. A current-limiting resistor $R_{lim1}$ is put into use to limit a discharge current and consume energy stored in the capacitor, thereby ensuring the safety of the switches $S_{n1}$ and $S_{n2}$.

After it is detected that the faulty module has been bypassed and removed, a redundant resonant conversion module $R_e$ is put into use. Generally, by default, all switch transistors are in locked states before the redundant resonant conversion module is put into use. First, the bypass switch $S_{Re2}$ of the redundant resonant conversion module is opened. As the input capacitor of the redundant module is charged from zero, a current-limiting resistor $R_{limRe}$ is introduced to perform current-limiting charging on the input capacitor $C_{inRe}$, to reduce current surge. Then, after it is detected that voltage $v_{inRe}$ at two ends of the input capacitor reaches a predetermined starting voltage, soft start is performed on the redundant resonant conversion module by changing control loop parameters. A switching frequency and a duty cycle are adjusted to limit the current impact on a resonant cavity and switch transistors during the starting of the redundant resonant conversion module. Finally, after the redundant resonant conversion module operates stably, the switch $S_{Re1}$ is closed, and the buffer current-limiting resistor $R_{limRe}$ is bypassed, to reduce loss caused during long-term stable operation of the redundant resonant conversion module. To this end, the seabed ISOP direct-current converter system is subjected to topology reconstruction after the faulty resonant conversion module is removed and the redundant resonant conversion module is put into use, thus achieving fault redundant operation and reducing the negative impact of surge current stress throughout the process.

In a first stage of starting, all the switch transistors inside the LLC conversion module $R_e$ are locked. In a second stage of starting, when the voltage of the input capacitor of the redundant resonant conversion module reaches a preset soft start voltage, the redundant resonant conversion module $R_e$ will be started to charge the output filter capacitor. To reduce the current stress impact on the output capacitor, a high switching frequency and a small duty cycle are used to start the redundant resonant conversion module, and then the switching frequency is slowly reduced to a resonance frequency. Meanwhile, the duty cycle is increased to a rated duty cycle, and the voltage of the output capacitor is detected, to charge the output capacitor to a rated output voltage. A grading ring and a current ring of the redundant resonant conversion module are put into use; a reference value is modified; and the ISOP direct-current converter system is reconstructed and enters a new stable state.

Figure 6:
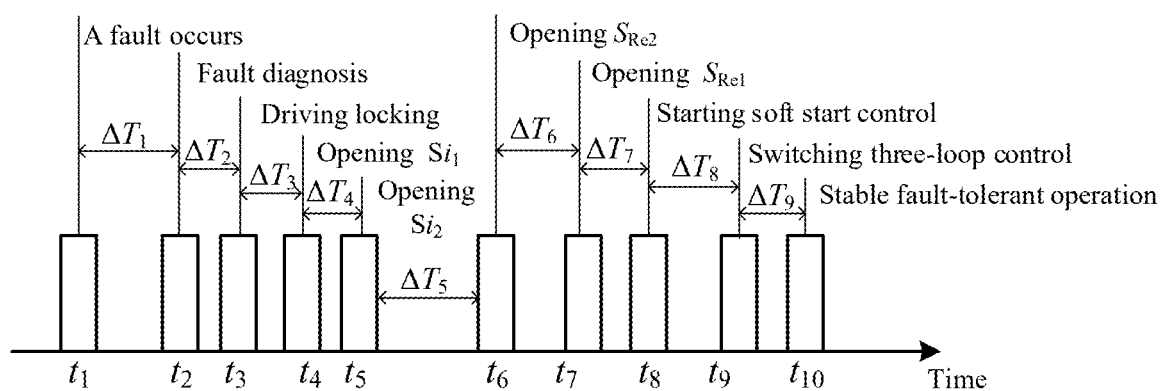
FIG. 6 is a schematic time sequence diagram of a fault tolerance method based on a seabed medium-voltage direct-current converter in an embodiment.

In some embodiments, as shown in FIG. 6, a schematic time sequence diagram of a fault tolerance method based on a seabed medium-voltage direct-current converter is shown:

According to a fault characteristic and a diagnosis result, in conjunction with the redundant switching control method for the seabed ISOP converter system analyzed in this section, the present disclosure designs the overall fault-tolerant operation solution for the seabed ISOP direct-current converter, including a relatively perfect diagnosis circuit, a power circuit, a fault tolerance circuit, and other system structures, as well as faulty submodule diagnosis and isolation, redundant resonant conversion module put-into-use and control, and related sequential coordination.

If submodule i of the seabed ISOP converter fails at time $t_1$, after $\Delta T_1$, a fault diagnosis module is triggered at $t_2$, and an input voltage $V_{inn}$, an input current $I_{infn}$, and an output voltage Vout of the submodule are acquired by sensors, and a position of the faulty submodule is determined according to a fault diagnosis principle. Internal module level fault diagnosis of the subsea ISOP converter is completed at time $\Delta T_2$. After the faulty module is determined, a DSP main controller sends a switch transistor locking signal $T_i$ to the sub controller of the faulty module at $t_3$, and completes locking of the switch transistors of the faulty module within $\Delta T_3$, to avoid further damage to the ISOP converter caused by the fault. After the locking of the switch transistors is completed, the DSP main controller then sends a current-limiting resistor bypass switch off signal to the sub controller of the faulty module to drive the switch $S_{i1}$ to be opened within $\Delta T_4$. Due to the use of the direct-current contractor which is a non-fully controlled switch device to reduce on-state loss, $\Delta T_4$ is above the millisecond level. The purpose of this process is to put into use the buffer current-limiting resistor $R_{limi}$ for the next step of a discharge current of the input capacitor of the faulty module, to avoid damage to the device caused by a surge current. After the switch $S_{i1}$ is opened, the DSP main controller then sends a submodule bypass switch off signal to the sub controller of the faulty module at $t_5$ to drive the switch $S_{i2}$ to be opened. In this case, since the input end of the faulty submodule is bypassed by the switch $S_{i2}$, the energy will not be transmitted to the faulty submodule, and the input current may flow in the normal modules through the switch $S_{i2}$. Furthermore, the opened switch $S_{i2}$ will form a discharge circuit with the current-limiting resistor $R_{limi}$ and the input capacitor. The discharge time has been analyzed in the previous section, and time of completing the entire process is $\Delta T_5$. After the release of the energy of the input capacitor of the faulty submodule is completed, the put-into-use stage of the redundant module will be executed. The DSP main controller sends a redundant module bypass switch $S_{Re2}$ off signal to the sub controller of the redundant module at to, to drive the switch $S_{Re2}$ to be opened. In this case, the switch of the redundant module is locked, and the bus voltage will charge the input capacitor $C_{inRe}$ through the buffer current-limiting resistor $R_{limRe}$ until the voltage $V_{inRe}$ of the input capacitor reaches the preset soft start voltage of the module. The entire process is completed within $\Delta T_6$. After the voltage of the input capacitor reaches the preset voltage, the DSP main controller then sends a current-limiting resistor bypass switch on signal to the sub controller of the faulty module at $t_7$, to drive the switch SRe1 to be closed within $\Delta T_7$. The current-limiting resistor $R_{limRe}$ is bypassed to reduce the resistance loss during the subsequent normal operation. After it is detected that the switch $S_{Re1}$ is closed, the DSP main controller then sends an LLC resonant conversion module soft start control signal at $t_8$ to the sub controller of the redundant module. A switching frequency that is 1.5 times the rated switching frequency and a duty cycle that is 10% of the rated duty cycle are initially set. Then, according to a linear rule, the switching frequency is gradually reduced to the rated switching frequency according to a linear rule, and the duty cycle is gradually increased to the rated duty cycle, to limit an output voltage rise rate until the output voltage reaches the rated value, thereby avoiding damage to the device caused by surge current stress during the starting process. The entire soft start process of the module is completed within $\Delta T_8$. After the soft start of the redundant module ends, the DSP controller switches the soft start control program to a three-loop control program at $t_9$, and applies the sampled input voltage and output current of the redundant module to the grading ring and an inner loop control program of the output circuit. The entire program switching and adjustment process is completed within $\Delta T_9$. The above process completes topology reconstruction and control adjustment. The entire seabed ISOP converter system is recovered to the stable operating state at $t_{10}$, which effectively achieves a fault-tolerant operation.

In some embodiments, to verify the correctness and effectiveness of the fault tolerance method based on the seabed medium-voltage direct-current converter in the present disclosure, a cascaded ISOP direct-current converter simulation model composed of three LLC resonant conversion modules using three-closed-loop control is built. The key parameters are shown in Table 1:

TABLE 1

| Parameter | Value |
|---|---|
| Number of modules | 3 |
| Input voltage (V) | 3000 |
| Output voltage (V) | 375 |
| Load resistance (Ω) | 4.6875 |
| Switching frequency (kHz) | 100 |
| Number of redundant modules | 1 |

Figure 7:
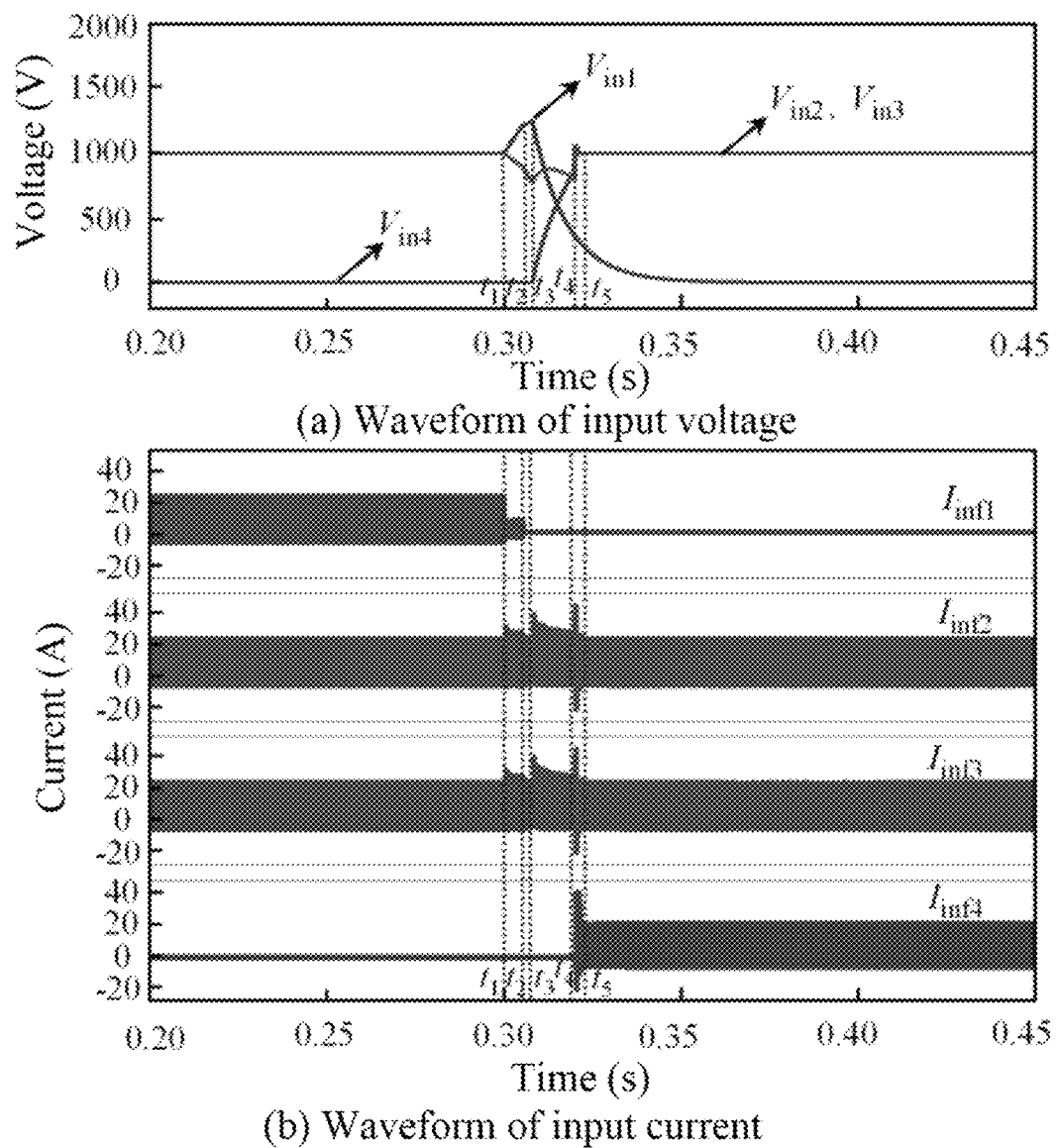
Figure 8:
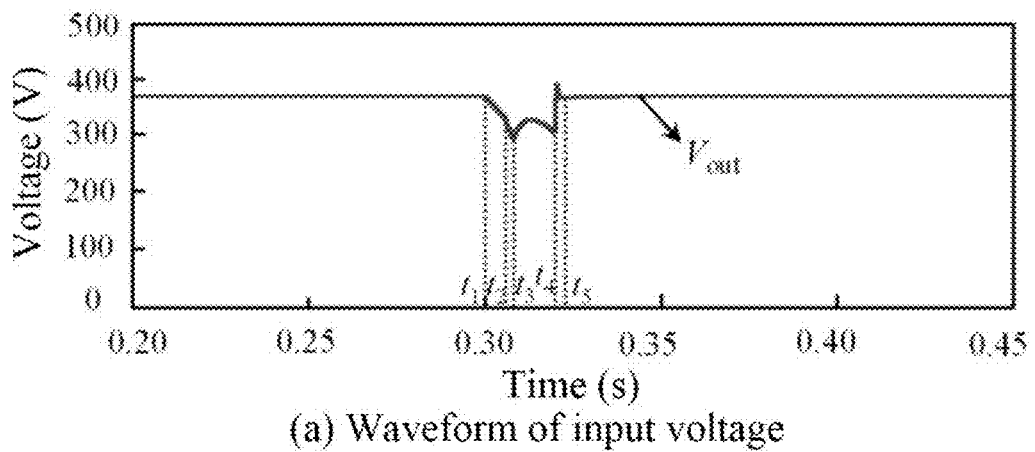
Figure 8:
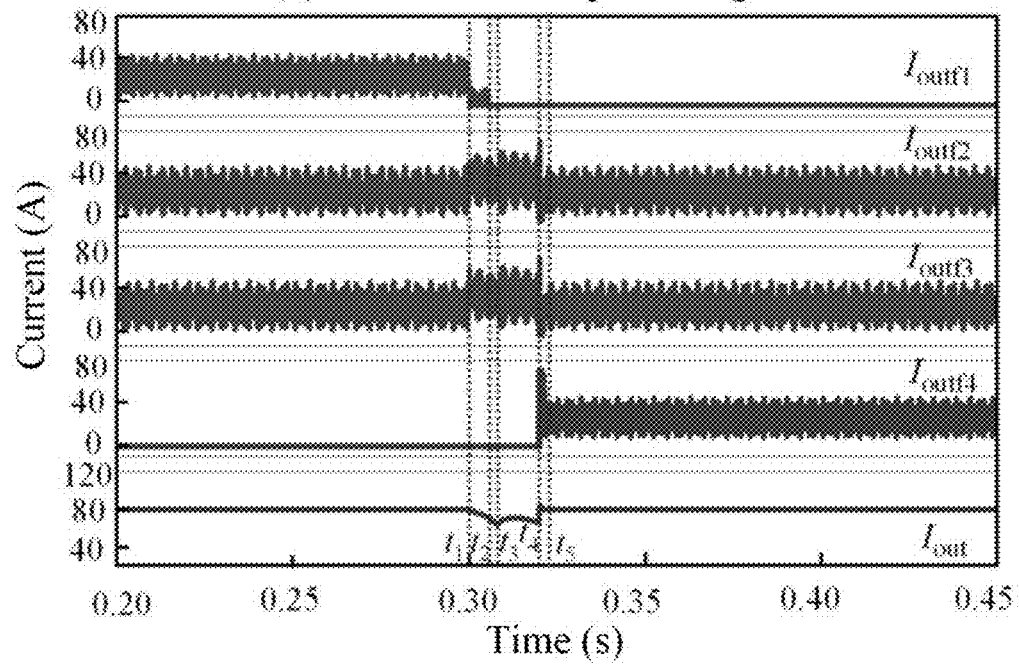

After an open circuit fault of the switch transistor of the LLC conversion module 1 is simulated, the ISOP converter uses the method for fault diagnosis, redundant switching, and a series of operations to achieve fault-tolerant operation. FIG. 7 shows a waveform of an input port during fault-tolerant operation of the ISOP converter after the LLC conversion module 1 fails. FIG. 8 shows a waveform of an output port during fault-tolerant operation of the ISOP converter after the LLC conversion module 1 fails. From FIG. 7 and FIG. 8, it can be seen that at t1=0.3, an open circuit fault occurs in the switch transistor of the LLC conversion module 1. In this case, a transient process of the fault is consistent with a fault characteristic analysis result. The voltage Vin1 of the input capacitor of the LLC conversion module 1 increases, and the input voltages Vin2 and Vin3 of other LLC conversion modules that do not fail decrease. Meanwhile, due to the charging of the capacitor of the LLC conversion module 1, the input current Iinf1 of the LLC conversion module 1 sharply decreases and then slightly increases. The input currents Iinf2 and Iinf3 of other LLC conversion modules that do not fail sharply increase and then decrease. Furthermore, the output current and the input current have the same change rule. The output current Ioutf1 of the LLC conversion module 1 also decreases, and the output currents Ioutf2 and Ioutf3 of other LLC conversion modules that do not fail also increase. In this case, due to the change in the input voltage, the control strategy of the system loses its effect, so that both the output voltage Vout and the output current Iout of the system decrease.

At around $t_2=0.305$s, the system detects a fault and locates the faulty module, namely the LLC conversion module 1. The controller sends a signal to lock all the switch transistors of the LLC conversion module 1. Since the process is completed at the microsecond level, almost simultaneously, the current-limiting resistor bypass switches S11 related to the LLC conversion module 1 are opened. When there is no energy transmitted from the faulty module, the current-limiting resistor is put into use to limit the discharge current of the input capacitor of the LLC conversion module 1 in the next stage. Ing this process, the input and output voltages and currents of each LLC conversion module continue to follow the change trend of the previous stage. However, the LLC conversion module 1 is almost removed from the system, so the decrease rates of the input voltage Vout and the input current Iout are increased. The input voltage Vin1 of the LLC conversion module 1 increases slowly, and the input voltages Vin2 and Vin3 of other LLC conversion modules decrease quickly. Since the switches of the LLC conversion module 1 are locked, the input current Iinf1 becomes 0, and the input currents Iinf2 and Iinf3 of other LLC conversion modules sharply decrease to normal values.

At around t3=0.308s, the bypass switch S12 of the LLC conversion module 1 is closed, and the bypass switch of the redundant switching structure is opened. The input capacitor of the LLC conversion module 1 begins to be discharged through the current-limiting resistor, and the input voltage Vin1 begins to decrease according to a capacitor discharge curve. The input capacitor of the redundant switching structure is put into use in a power circuit, and starts to be charged through the current-limiting resistor. The input voltage Vin4 increases according to a capacitor charge curve. The input voltages Vin2 and Vin3 of other LLC conversion modules will first increase and then decrease due to the discharge of the input capacitor of the LLC conversion module 1 and the charge of the input capacitor of the redundant switching structure. Since the output voltage Vout at this stage is provided by the healthy submodules, i.e. other LLC conversion modules that do not fail, the output voltage Vout and the output current Iout also show a first increase and then decrease trend. After the faulty module is locked, the input current Iinf1 will remain consistent at 0. The input currents Iinf2 and Iinf3 of other LLC conversion modules that do not fail will first sharply increase and then slowly decrease because of bypass removal of the LLC conversion module 1, the discharge of the input capacitor, and the charge of the input capacitor of the redundant switching structure. The conversion rules of the output currents and input currents of the modules still remain consistent.

To reduce the current surge, the charge and discharge time of the capacitor are relatively slow. At around time t4=0.32s, it is detected that the voltage Vin4 of the input capacitor of the redundant switching structure exceeds 800 V. At the preset soft start voltage, and the LLC conversion module connected to the redundant switching structure is started. After a short period of time, when the input voltage approaches a normal value, the soft start control is cut off, the three-loop control is put into use. At around t5=0.322 seconds, the input voltages of the LLC conversion modules after reconstruction are balanced and stabilized at 1000 V, and the input currents and output currents of the LLC conversion modules are restored to normal values. Meanwhile, the output voltage of the ISOP converter system has stabilized at around 375 V, and the output current is stabilized back to around 80 A. In the entire process from the occurrence of the fault to the end of the fault tolerance control, the output voltage of the system has decreased by 311 V at most in a decrease percentage of 17%. Meanwhile, the output current of the system has decreased by 65 A at most in a decrease percentage of 18.8%.

The above simulation results have verified the effectiveness of the fault-tolerant operation solution and improved the reliable operation capability of the ISOP type direct-current converter.

It is understood that although the steps in the flowcharts of the various embodiments mentioned above are displayed in sequence according to the instructions of the arrows, these steps are not necessarily performed in sequence according to the sequence indicated by the arrows. Unless otherwise explicitly specified in the present disclosure, execution of the steps is not strictly limited, and the steps may be performed in other sequences. Moreover, at least some of the steps in the flowcharts of the various embodiments may include a plurality of steps or a plurality of stages. These steps or stages are not necessarily performed at the same moment but may be performed at different moments. Execution of these steps or stages is not necessarily performed in sequence, but may be performed in turn or alternately with other steps or at least some of steps or stages of other steps.

Based on the same inventive concept, an embodiment of the present disclosure further provides a fault tolerance device based on a seabed medium-voltage direct-current converter for implementing the fault tolerance method based on the seabed medium-voltage direct-current converter. The implementation solution provided by the device to solve the problem is similar to the implementation solution recorded in the above method. Therefore, specific limitations in the one or more embodiments of the fault tolerance device based on the seabed medium-voltage direct-current converter can be found in the limitations on the above fault tolerance method based on the seabed medium-voltage direct-current converter, and will not be elaborated here.

In some embodiments, an embodiment of the present disclosure further provides a redundant topological structure. The redundant topological structure includes a plurality of cascaded redundant switching structures, and an output end of each redundant switching structure is connected to an input end of a resonant conversion module corresponding to the redundant switching structure; output ends of the resonant conversion modules are respectively connected to two ends of a load; an electric energy input end of the redundant topological structure is connected to one end of a power supply; an electric energy output end of the redundant topological structure is connected to one end of the load; the other end of the load is connected to the other end of the power supply; and electric energy generated by the power supply flows into the load after being processed by the redundant topological structure.

Figure 9:
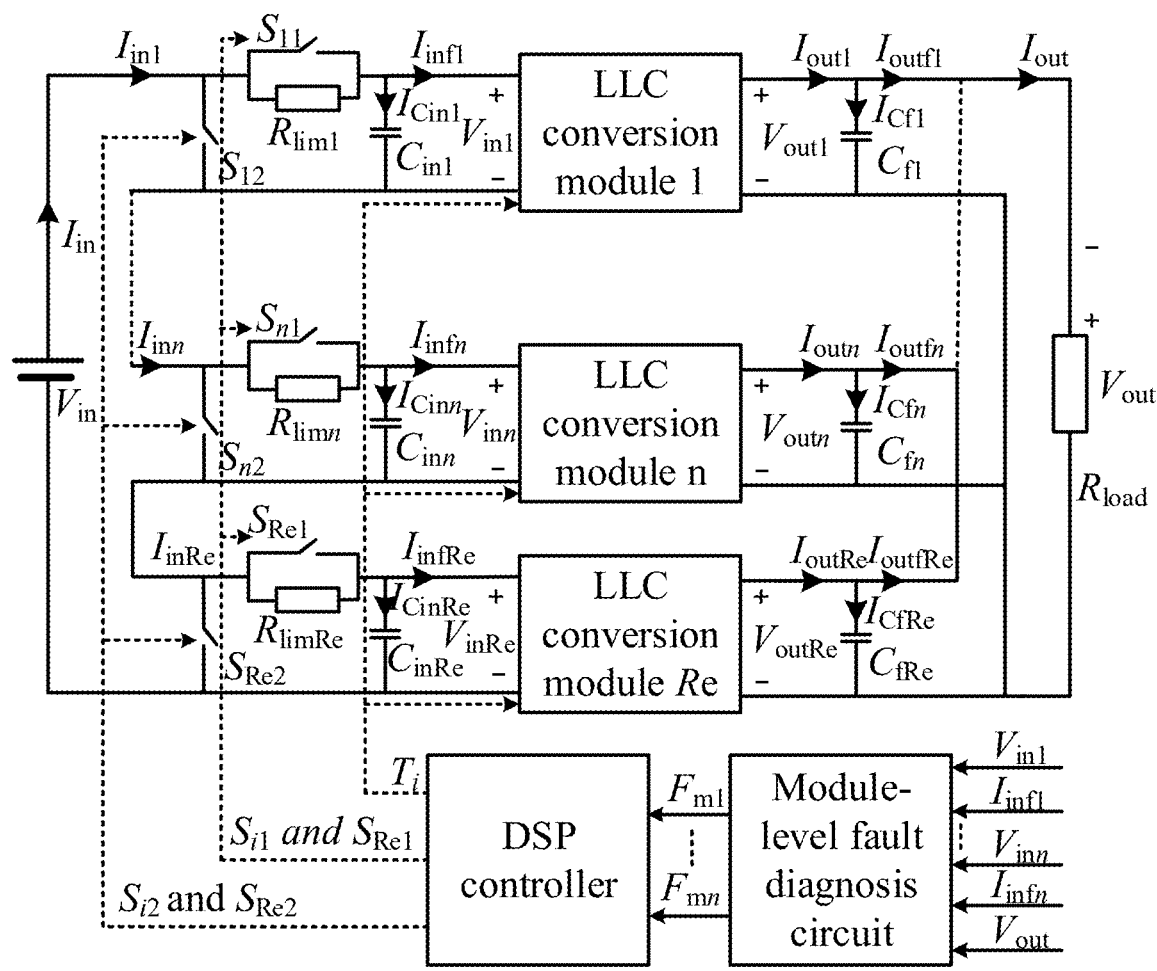
FIG. 9 is a structural block diagram of a redundant topological structure in another embodiment.

In some embodiments, FIG. 9 shows a schematic structural diagram of a fault tolerance topological structure of a seabed ISOP direct-current converter in an embodiment.

FIG. 9 mainly includes LLC conversion modules, redundant switching structures (a direct-current contactor Sn1, a direct-current contactor Sn2, and a resistor Rlinn), where n is 1, 2 . . . i, and a module-level fault diagnosis circuit, a DSP controller, and the like. The design of the module-level fault diagnosis circuit is used for detecting and positioning a faulty module. The DSP controller is a microcontroller commonly used for digital signal processing and is used as a main controller of the ISOP direct-current converter system. In addition to normal control, the controller is also used for fault redundant switching control. The fault tolerance method based on the seabed medium-voltage direct-current converter provided in the present disclosure is to process the input voltages, the input currents, and the output voltages of the submodules through module-level fault diagnosis, and transmit diagnosis results to the DSP main controller. The main controller then performs redundant switching control based on the diagnosis results, controls faulty module isolation and redundant module switching, and finally controls a reconstructed topology to restore its normal operation. The present disclosure achieves smooth switching of fault-tolerant operations by cooperation of the procedures.

Figure 10:
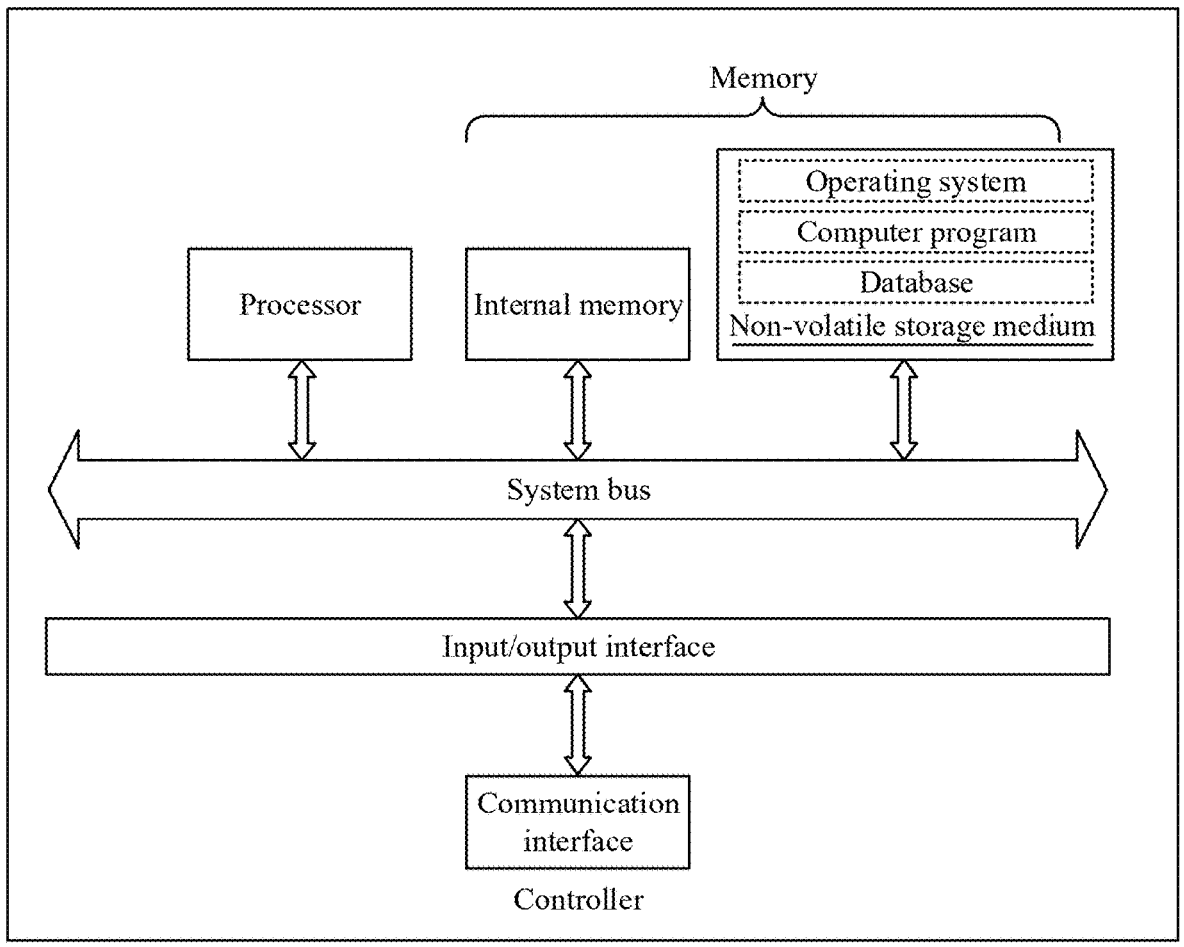
FIG. 10 is a diagram of an internal structure of a controller in an embodiment.

In an embodiment, a controller is provided. The controller may be a server, and FIG. 10 shows a diagram of an internal structure of the controller. The controller includes a processor, a memory, an input/output (I/O) interface, and a communication interface. The processor, the memory, and the input/output interfaces are connected through a system bus, and the communication interface is connected to the system bus through the input/output interface. The processor of the controller is configured to provide computation and control abilities. The memory of the controller includes a non-volatile storage medium and an internal memory. The non-volatile storage medium stores an operating system, a computer program, and a database. The internal memory provides an environment for running the operating system and the computer program in the non-volatile storage medium. The database of the controller is configured to store relevant data of a direct-current converter. The input/output interface of the controller is configured to exchange information between the processor and an external device. The communication interface of the controller is configured to communicate with an external terminal through network connection. The computer program, when run by a processor, implements a fault tolerance method based on a seabed medium-voltage direct-current converter.

A person skilled in the art can understand that the structure shown in FIG. 10 is merely a block diagram of partial structures related to a solution in the present disclosure, and does not constitute a limitation on the controller to which the solution of the present disclosure is applied. Specifically, the controller may include more components or fewer components than those shown in the figure, or some components may be combined, or a different component deployment may be used.

It should be noted that user information (including but not limited to user device information and user personal information) and data (including but not limited to data for analysis, stored data, displayed data, and the like) involved in the present disclosure are information and data authorized by a user or fully authorized by all parties, and the acquisition, use, and processing of the relevant data need to comply with relevant laws, regulations, and standards of relevant countries and regions.

A person of ordinary skill in the art may understand that all or some of the procedures of the method in the foregoing embodiments may be implemented by the computer-readable instructions that instruct relevant hardware. The computer program may be stored in a non-volatile computer-readable storage medium. When the computer program is executed, the procedures of the foregoing method embodiments may be implemented. Any reference to the memory, the database, or other media used in the embodiments provided in the present disclosure can include at least one of a non-volatile memory and a volatile memory. The non-volatile memory may include a read-only memory (ROM), a magnetic tape, a floppy disk, a flash memory, an optical memory, a high-density embedded non-volatile memory, a resistive random-access memory (ReRAM), a magneto resistive random-access memory (MRAM), a ferroelectric random-access memory (FRAM), a phase change memory (PCM), a graphene memory, and the like. The volatile memory can include a random-access memory (RAM), external cache memory, or the like. As an illustration, not a limitation, the RAM may be in many forms, such as a static random-access memory (SRAM) or a dynamic random-access memory (DRAM). The databases involved in the various embodiments provided in the present disclosure may include at least one of a relational database and a non-relational database. The non-relational database can include, but not limited to, a blockchain-based distributed database. The processors involved in the various embodiments provided in the present disclosure can be, but are not limited to, a general-purpose processor, a central processing unit, a graphics processor, a digital signal processor, a programmable logic device, a data processing logic device based on quantum computation, and the like.

All the technical features of the above embodiments can be combined randomly. For the sake of brevity, all possible combinations of all the technical features in the above embodiments are not described. However, these technical features shall all be considered to fall within the scope of this specification as long as there is no contradiction in their combinations.

The foregoing embodiments merely express several implementations of the present disclosure. The descriptions thereof are relatively specific and detailed, but are not understood as limitations on the scope of the present disclosure. A person of ordinary skill in the art can also make several transformations and improvements without departing from the idea of the present disclosure. These transformations and improvements fall within the protection scope of the present disclosure. Therefore, the protection scope of the present disclosure shall be subject to the appended claims.

What is claimed is:

1. A fault tolerance method based on a seabed medium-voltage direct-current converter, applied to a controller, wherein a signal end of the controller is connected to a signal end of a direct-current converter comprising a redundant topological structure; an electric energy input end of the redundant topological structure is connected to one end of a power supply; an electric energy output end of the redundant topological structure is connected to one end of a load; the other end of the load is connected to the other end of the power supply; electric energy generated by the power supply flows into the load after being processed by the redundant topological structure;

the redundant topological structure comprises a plurality of cascaded redundant switching structures, and an output end of each redundant switching structure is connected to an input end of a resonant conversion module corresponding to the redundant switching structure; output ends of the resonant conversion modules are respectively connected to two ends of the load; each redundant switching structure at least comprises a first direct-current contactor and a second direct-current contactor; an input end of the first direct-current contactor and an input end of the second direct-current contactor are connected to one end of the power supply, and an output end of the first direct-current contactor and an output end of the second direct-current contactor are respectively connected to two ends of an input filter capacitor;

the method comprises:
  controlling a working state of a redundant resonant conversion module to a locked state, sending a first switch open or close signal to the redundant switching structure connected to the redundant resonant conversion module, and controlling, based on the first switch open or close signal, the first direct-current contactor of the redundant switching structure connected to the redundant resonant conversion module to be opened and the second direct-current contactor of the redundant switching structure connected to the redundant resonant conversion module to be closed; controlling working states of other resonant conversion modules other than the redundant resonant conversion module to unlocked states, sending a second switch open or close signal to the redundant switching structures connected to other resonant conversion modules, and controlling, based on the second switch open or close signal, the first direct-current contactors of the redundant switching structures connected to other resonant conversion modules to be closed and the second direct-current contactors of the redundant switching structures connected to other resonant conversion modules to be opened, to supply the electric energy output by the power supply to the load after being processed by the resonant conversion modules;
  in the process of supplying power to the load, obtaining fault diagnosis results for the resonant conversion modules;
  when it is determined, based on the fault diagnosis results, that a faulty module exists in the resonant conversion modules, removing the faulty module, wherein the faulty module is a failed resonant conversion module among the resonant conversion modules; and
  after the faulty module is removed, determining a redundant resonant conversion module, and adjusting the working state of the redundant resonant conversion module and the switch state of the redundant switching structure connected to the redundant resonant conversion module, wherein the redundant resonant conversion module is configured to replace the faulty module.

2. The method according to claim 1, wherein the signal end of the controller is further connected to a fault diagnosis module, and the method further comprises:
  obtaining, by the fault diagnosis module, circuit parameters of the resonant conversion modules, and performing fault diagnosis respectively for the resonant conversion modules based on the circuit parameters to obtain the fault diagnosis results, and sending the fault diagnosis results to the controller; and obtaining, by the controller, the fault diagnosis results sent by the fault diagnosis module.

3. The method according to claim 1, wherein when it is determined, based on the fault diagnosis results, that a faulty module exists in the resonant conversion modules, the removing the faulty module comprises:
  outputting a switch locking signal to the faulty module to control the faulty module to complete locking of a switch transistor; and
  when it is determined that the switch transistor in the faulty module is locked, controlling the switch state of the redundant switching structure connected to the faulty module to remove the faulty module.

4. The method according to claim 3, wherein each redundant switching structure comprises a first direct-current contactor, a second direct-current contactor, and a current-limiting resistor connected in parallel to the first direct-current contactor; an input end of the first direct-current contactor and an input end of the second direct-current contactor are connected to one end of the power supply, and an output end of the first direct-current contactor and an output end of the second direct-current contactor are respectively connected to two ends of an input filter capacitor; and the controlling the switch state of the redundant switching structure connected to the faulty module to remove the faulty module comprises:
  sending a switch off signal to the redundant switching structure connected to the faulty module, to drive, based on the switch off signal, the first direct-current contactor of the redundant switching structure connected to the faulty module to be opened, to limit a discharge current of the filter capacitor through the current-limiting resistor; and
  after it is determined that the first direct-current contactor of the redundant switching structure connected to the faulty module is opened, sending a switch on signal to the redundant switching structure connected to the faulty module, driving, based on the switch on signal, the second direct-current contactor of the redundant switching structure connected to the faulty module to be closed.

5. The method according to claim 1, wherein the redundant switching structure connected to the redundant resonant conversion module comprises a first direct-current contactor, a second direct-current contactor, and a current-limiting resistor connected in parallel to the first direct-current contactor; an input end of the first direct-current contactor and an input end of the second direct-current contactor are connected to one end of the power supply, and an output end of the first direct-current contactor and an output end of the second direct-current contactor are respectively connected to two ends of an input filter capacitor;
  the adjusting working states of the resonant conversion modules and switch states of the redundant switching structures connected to the resonant conversion modules comprises:
  sending a switch off signal to the redundant switching structure connected to the redundant resonant conversion module, to drive, based on the switch off signal, the second direct-current contactor of the redundant switching structure connected to the redundant resonant conversion module to be opened, to perform current-limited charging on the filter capacitor through the current-limiting resistor;
  if it is detected, after the second direct-current contactor of the redundant switching structure connected to the redundant resonant conversion module is opened, that a voltage of the filter capacitor reaches a preset voltage threshold, controlling the redundant resonant conversion module to be started; and
  when the redundant resonant conversion module is in a stable operating state, sending a switch on signal to the redundant switching structure connected to the redundant resonant conversion module, and driving, based on the switch on signal, the first direct-current contactor of the redundant switching structure connected to the redundant resonant conversion module to be closed.

6. The method according to claim 5, wherein the controlling the redundant resonant conversion module to be started comprises:
  sending a soft start control signal to the redundant resonant conversion module, and changing a switching frequency and a duty cycle based on the soft start control signal, to start the redundant resonant conversion module.

\* \* \* \* \*